United States Patent
Murr et al.

[11] Patent Number: 5,804,888
[45] Date of Patent: Sep. 8, 1998

[54] ANTI-THEFT SYSTEM FOR A MOTOR VEHICLE

[75] Inventors: Robert Murr, Barbing; Bernhard Foerstl, Kelheim; Thomas Roehrl, Barbing; Herbert Zimmer, Regensburg, all of Germany

[73] Assignee: Siemens Aktiengesellschaft, Munich, Germany

[21] Appl. No.: 520,239

[22] Filed: Aug. 28, 1995

[30] Foreign Application Priority Data

Aug. 26, 1994 [DE] Germany .......................... 44 30 360.2

[51] Int. Cl.⁶ .................................................. B60R 25/04
[52] U.S. Cl. .......................... 307/10.2; 180/287; 307/10.5
[58] Field of Search ................... 307/10.1–10.6; 340/425.5, 426, 825.3–825.32, 825.34, 825.54, 825.69, 825.72, 825.23; 180/287; 70/277, 237, 264, DIG. 46, 413; 375/200, 202

[56] References Cited

U.S. PATENT DOCUMENTS 4,918,955  4/1990  Kimura et al. .
5,616,966  4/1997  Fischer et al. ........................ 307/10.5

OTHER PUBLICATIONS

"The Pit and Amplitude Demodulation" (Kirchner), AN 94007, Aug. 1994, pp. 3–27.

*Primary Examiner*—Richard T. Elms
*Attorney, Agent, or Firm*—Herbert L. Lerner; Laurence A. Greenberg

[57] ABSTRACT

An anti-theft system for a motor vehicle includes a portable transponder carrying an item of code information. A stationary antenna has a resonant circuit with components and a resonant frequency being determined by the components. An oscillator oscillates at an oscillator frequency and has an output variable being used as an exciter variable with an exciter frequency for compelling an oscillation of the resonant circuit. The oscillation is amplitude-modulated as a function of the code information of the transponder. An evaluation unit receives the oscillation of the resonant circuit. The evaluation unit detects the modulated oscillation and demodulates the code information out of the oscillation. A comparator compares the code information with command code information and supplies an enable signal if a match occurs. A security unit receives the enable signal. The exciter frequency or the resonant frequency of the resonant circuit is varied if initially no code information is recognized by the evaluation unit.

13 Claims, 4 Drawing Sheets

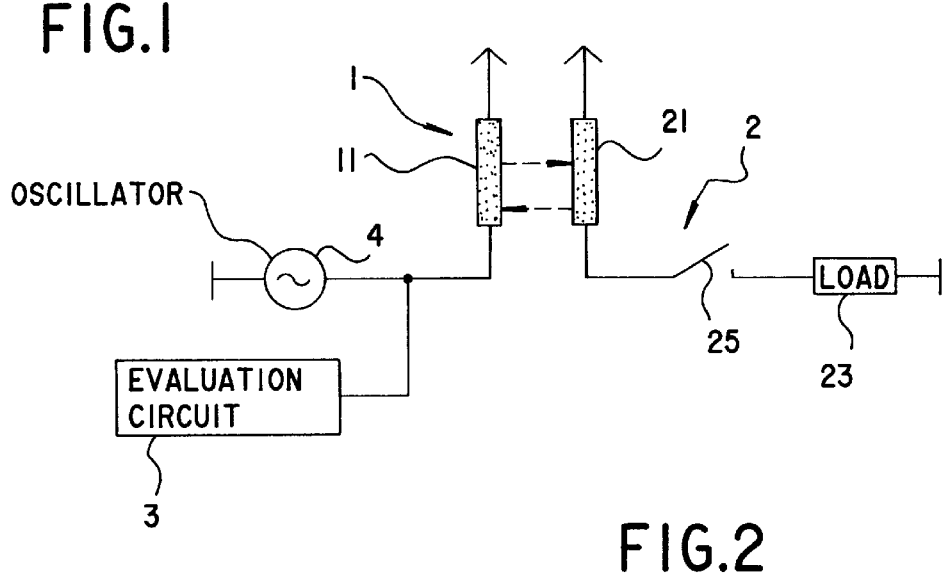
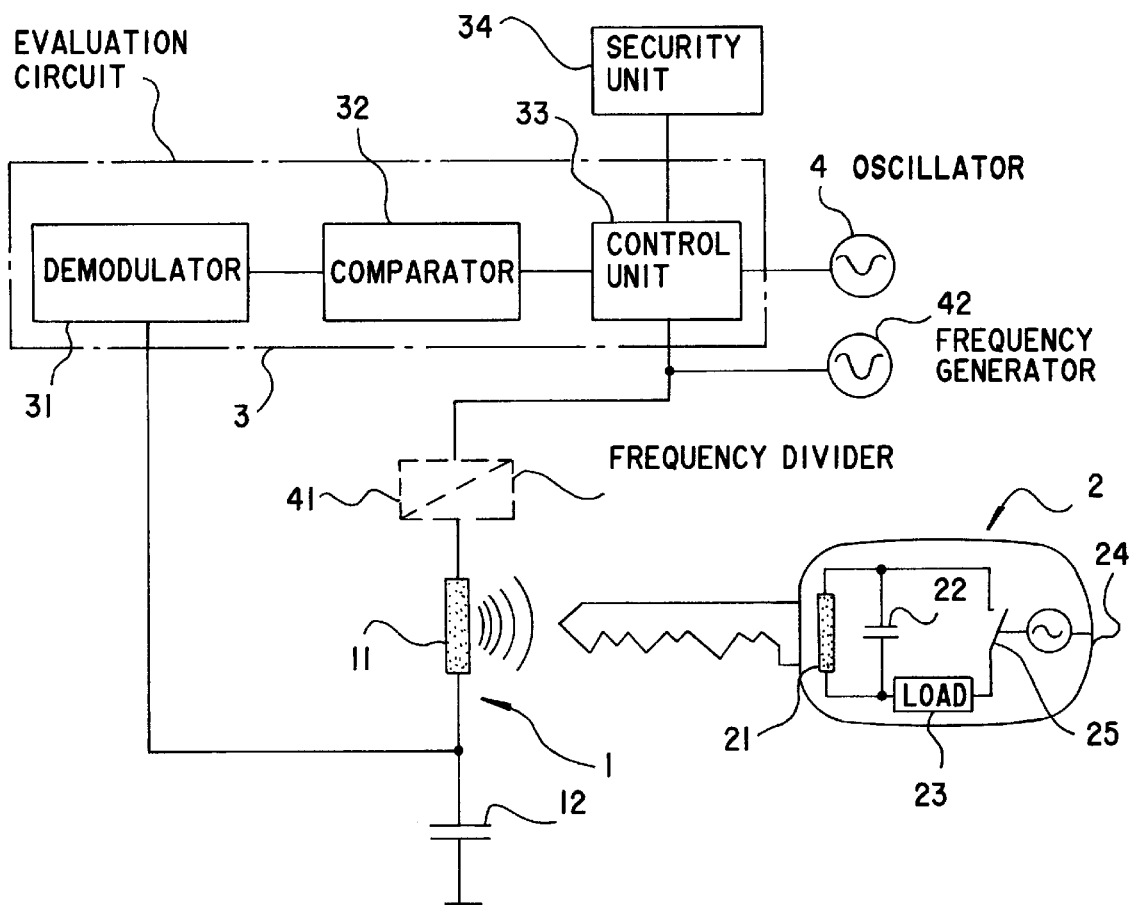

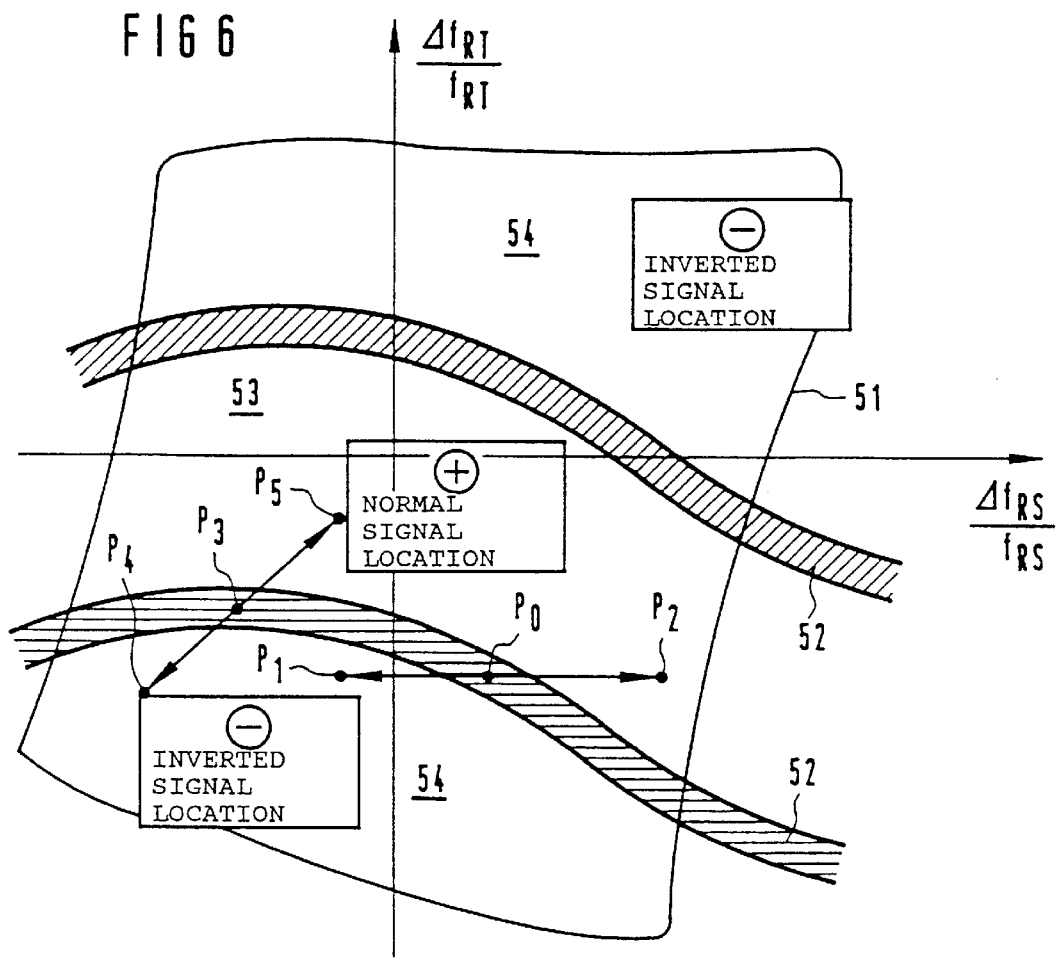

ANTI-THEFT SYSTEM FOR A MOTOR VEHICLE

BACKGROUND OF THE INVENTION

FIELD OF THE INVENTION

The invention relates to an anti-theft system for a motor vehicle. It pertains in particular to a locking system through which a driveaway interlock of the motor vehicle is enabled.

A known anti-theft system (U.S. Pat. No. 4,918,955) has an ignition lock with a transmitting antenna in the form of a coil. The coil is excited by an oscillator. The ignition key has a resonant circuit that cooperates with the transmitter coil. As soon as the ignition key is introduced into the ignition lock, coded information is transmitted from the key to the lock. If the coded information matches command or set-point code information, then a driveaway interlock in the motor vehicle is enabled, so that the vehicle can be started.

In such systems, even with the ignition key inserted and functioning properly, it is possible for no code information to be recognized by a receiving circuit. The reason therefor is that because of component tolerances or the effects of temperature, a system operating point is in a so-called zero point region.

SUMMARY OF THE INVENTION

It is accordingly an object of the invention to provide an anti-theft system for a motor vehicle, which overcomes the hereinafore-mentioned disadvantages of the heretofore-known devices of this general type and which permits reliable actuation of doors or starting of the vehicle despite component tolerances and temperature factors.

With the foregoing and other objects in view there is provided, in accordance with the invention, an anti-theft system for a motor vehicle, comprising a portable transponder carrying an item of code information; a stationary antenna having a resonant circuit with components and a resonant frequency being determined by the components; an oscillator oscillating at an oscillator frequency and having an output variable being used as an exciter variable with an exciter frequency for compelling or forcing an oscillation of the resonant circuit, the oscillation being amplitude-modulated as a function of the code information of the transponder; an evaluation unit receiving the oscillation of the resonant circuit, the evaluation unit detecting the modulated oscillation and demodulating the code information out of the oscillation; a comparator comparing the code information with command code information and supplying an enable signal if a match occurs; and a security unit receiving the enable signal; the exciter frequency or the resonant frequency of the resonant circuit being varied if initially no code information is recognized by the evaluation unit.

A stationary transmitter in a lock has a resonant circuit that is inductively coupled with a resonant circuit of a portable transponder in a key. In the transmitter, oscillation is compelled by an exciter variable, the energy of which is transmitted to the transponder, which in turn transmits coded data back to the transmitter. The code information of the transponder modulates the amplitude of the oscillation of the resonant circuit of the transmitter. A demodulator recovers the code information from the modulated oscillation and compares it with command or set-point information, and if there is a match an enable signal is generated.

If success is not at first gained in attempting to detect the code information, then the resonant circuit of the transmitter is "mistuned". To that end, the resonant frequency of the resonant circuit or its exciter frequency is changed.

In accordance with another feature of the invention, the resonant circuit has a transmitter coil and a capacitor connected in series or in parallel with the transmitter coil, for determining the resonant frequency.

In accordance with a further feature of the invention, there is provided at least one series or parallel resistor and/or at least one series or parallel capacitor, the resonant frequency of the resonant circuit being varied by adding or removing the at least one series or parallel resistor to or from the transmitter coil and/or by adding or removing the at least one series or parallel capacitor to or from the capacitor.

In accordance with an added feature of the invention, the exciter frequency is varied by varying the oscillator frequency.

In accordance with an additional feature of the invention, there is provided an adjustable frequency divider disposed between the oscillator and the resonant circuit for varying the exciter frequency.

In accordance with yet another feature of the invention, the exciter frequency is varied only within a predetermined tolerance width.

In accordance with yet a further feature of the invention, there is provided an ignition key on which the transponder is disposed, the ignition key turning on a supply of energy for the oscillator and the evaluation unit.

In accordance with yet an added feature of the invention, the exciter frequency or the resonant frequency is varied only within a predetermined period of time after the energy supply is turned on.

In accordance with yet an additional feature of the invention, there is provided a receiver coil through which the transponder is inductively coupled with the transmitter coil.

In accordance with again another feature of the invention, the oscillation of the resonant circuit is load-modulated as a function of the code information as a consequence of the inductive coupling.

In accordance with a concomitant feature of the invention, the security unit is a door lock or a driveaway interlock.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block circuit diagram of an anti-theft system according to the invention;

FIG. 2 is a schematic and block circuit diagram of a transmitter and a receiver of the anti-theft system;

FIG. 6 is a tolerance range diagram showing the location of an operating point of the anti-theft system.

DESCRIPTION OF THE PREFERRED EMBODIMENTS

Figure 3:
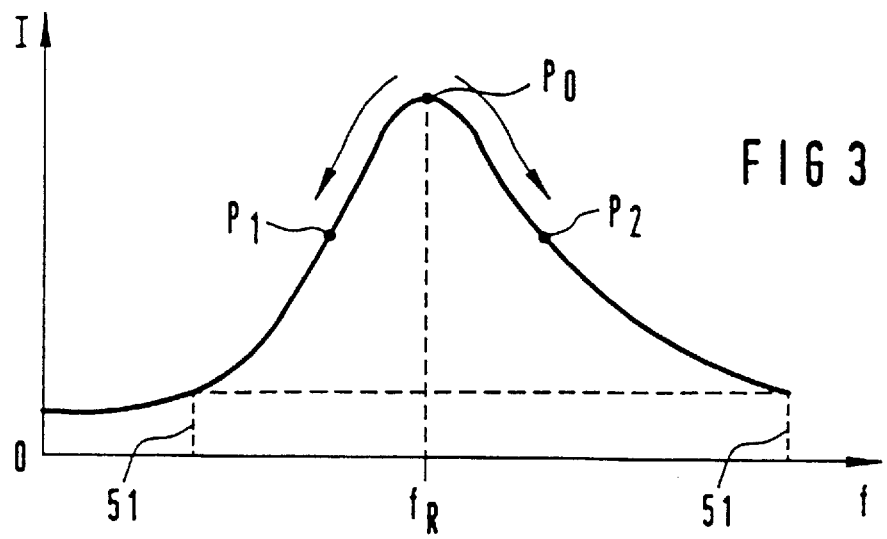
FIG. 3 is a diagram showing a resonance curve of a resonant circuit.

Referring now to the figures of the drawing in detail and first, particularly, to FIG. 1 thereof, there is seen an anti-theft system according to the invention which has a stationary transceiver 1 that cooperates with a portable transponder 2 through a transformer coupling, if the transponder is located in the vicinity of the transceiver 1. The transceiver 1 transmits energy (represented by a dashed-line arrow in FIG. 1) to the transponder 2 (the transceiver will therefore be referred to below as a transmitter 1). Code information stored in the transponder 2 is transmitted back to the transmitter 1 (energy transmission and return transmission of data are represented by arrows drawn in dashed lines).

To that end, the transmitter 1 has a transmitter coil 11, which by way of example is wound around an ignition lock. The transmitter coil 11 together with a transmitting capacitor 12 shown in FIG. 2 forms a resonant transmitter circuit. The resonant transmitter circuit is supplied by a generator or an oscillator 4 with an alternating voltage or an alternating current at the cadence of an oscillator frequency $f_O$ and is excited to oscillate. A field which is excited by the transmitter coil 11 induces a voltage in a transponder coil 21, since that coil is inductively coupled with the transmitter coil 11.

The transponder 2 has a load switch 25, which switches a load 23 on or off in the cadence of a predetermined item of code information stored in memory in the transponder. Since the two coils 11 and 21 are inductively coupled together (like the primary and secondary coils of a transformer, for instance), the oscillation of the resonant transmitter circuit is loaded by the transponder 2 in the rhythm of the code information. The code information is transmitted back to the transmitter 1 in a corresponding way. The code information is filtered out by an evaluation unit 3 from the oscillation resulting from the loading by the transponder 2 and is thus detected.

To that end, the evaluation unit seen in FIG. 2 has a demodulator 31, a comparator 32, and a control unit 33.

The transponder 2 can be integrated into a conventional ignition key. The transponder 2 has a resonant circuit with the transponder coil 21, a transponder capacitor 22 and the load 23. The load 23 is turned on or off at the rhythm of the code information by a code generator 24, through the load switch 25. As a result, the resonant transmitter circuit is loaded in the rhythm of the code information.

The memory for the code information is not shown. Such memories are well known and may be a reading memory, such as a ROM, or a programmable memory, such as an EEPROM.

The resonant transmitter circuit is forced to oscillate at an exciter frequency $f_E$ by the oscillator 4 with an exciter variable. The output voltage or output current of the oscillator is used as the exciter variable. The oscillator 4 oscillates at the oscillator frequency $f_O$. A frequency divider 41 may be disposed between the oscillator 4 and the resonant transmitter circuit and divides the oscillator frequency $f_O$ down to the desired exciter frequency $f_E$.

As a result of the exciter variable, a stationary compulsory oscillation of the resonant transmitter circuit occurs, and that circuit then oscillates at the exciter frequency $f_E$. Each resonant circuit has a natural frequency, which is also known as a resonant frequency $f_R$, that is determined by the components of the resonant circuit, or in other words the transmitter coil 11 and the transmitter capacitor 12. The generated field intensity of the transmitter coil 11 is highest when the resonant circuit excited at the exciter frequency $f_E$ is equal to the resonant $f_R$. These are the conditions under which the most energy is transmitted to the transponder 2.

A balance of power will be illustrated in terms of a resonance curve seen in FIG. 3, in which the frequency f is plotted on the abscissa (X axis) and the intensity of oscillation I as a function of the exciter variable, or in other words the amplitude of the exciter voltage or exciter current, is plotted on the ordinate (Y axis).

If the exciter frequency $f_E$ differs from the resonant frequency $f_R$, then the intensity of the oscillation becomes less, and less energy is transmitted to the transponder 2. Below a certain power limit 51 (represented in the drawing by two dashed lines to the left and right of the resonant frequency $f_R$), no evaluatable modulation amplitude of the oscillation can be detected because too little energy is transmitted. In other words, in that case the amplitude is too low.

When the ignition key is inserted into the ignition lock, the transmitter coil 11 and the transponder coil 21 are then in the immediate vicinity of one another. The two coils 11 and 21 in that case are inductively coupled to one another in such a way that the transponder 2 can act with its code information upon the resonant circuit.

The oscillation of the resonant circuit is load-modulated by turning the load 23 on and off. This is equivalent to an amplitude modulation. The resonant frequency $f_R$ and the frequency at which the resonant circuit oscillates (equivalent to the exciter frequency $f_E$) are not varied as a result of this load modulation. Only the amplitude and the phase of the oscillation vary, as compared with the oscillation that is unaffected by the transponder 2.

The code information of the transponder 2 is contained in the varied, modulated amplitudes of the primary oscillation on the transmitter side. The evaluation unit 3 "filters" the code information out of the oscillation.

The resonant circuit oscillates at the exciter frequency $f_E$ and is load-modulated with the code information. An amount demodulator is used as the demodulator 31, which detects only the amount of the amplitude of the oscillation, regardless of the sign and the phase, at any moment. From this amplitude, the demodulator 31 subtracts the oscillation amplitude without the effect of the transponder 2, in such a way that only the code information is left over at its output. It carries the code information to the comparator 32, which digitizes the information, and to the control unit 33, where it is compared with command code information stored in memory.

If the two items of code information match, then an enable signal is sent to the control unit 33. The control unit 33 thereupon triggers a security unit 34 in the motor vehicle. This unit may be a central door unlocking system or an engine enable control (driveaway interlock).

The term driveaway interlock is understood to mean electronic devices in the motor vehicle that allow the engine to be started only upon authorized release. For instance, the engine control unit, an on/off valve in the fuel line, or a switch in the ignition circuit can be enabled by the control unit 33.

Voltages or currents that oscillate at a certain frequency are unequivocally defined by two variables, that is by amplitude and phase location. In order to illustrate such variables, they are typically shown in a pointer diagram in the complex plane Z. The real portion is then plotted on the X axis and the imaginary portion on the Y axis.

Figure 4A:
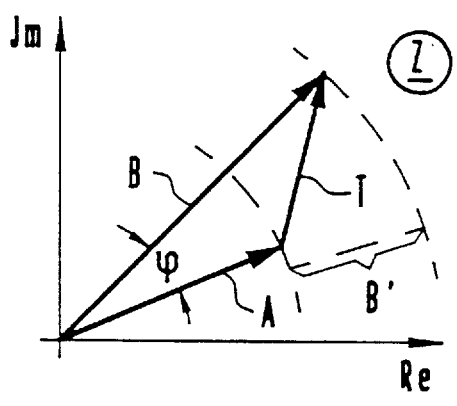
FIGS. 4a–4c are pointer diagrams for an instantaneous value of a detected oscillation of the resonant circuit.
Figure 4C:
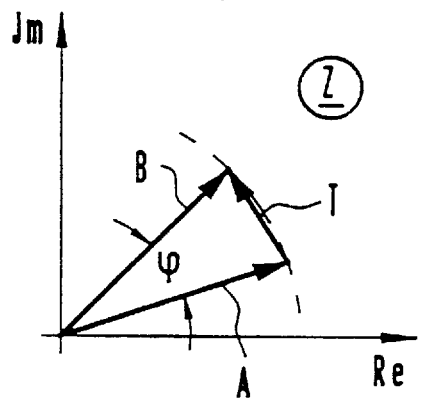
Figure 4B:
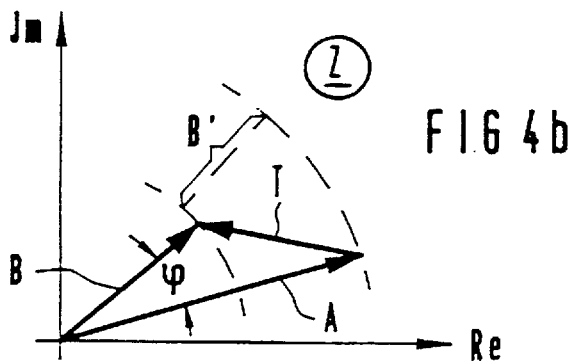
Figure 5A:
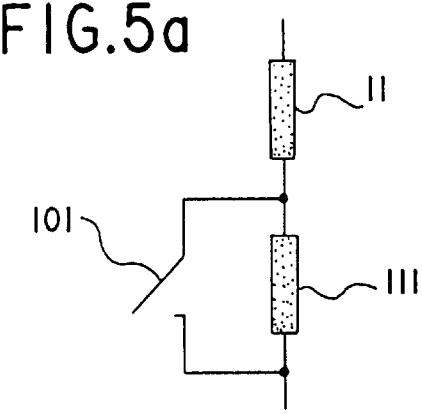
FIGS. 5a–5d are schematic circuit diagrams of possible variations of the components of the resonant circuit.
Figure 5C:
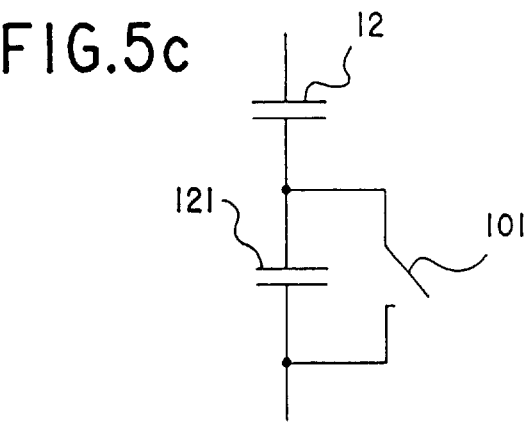
Figure 5B:
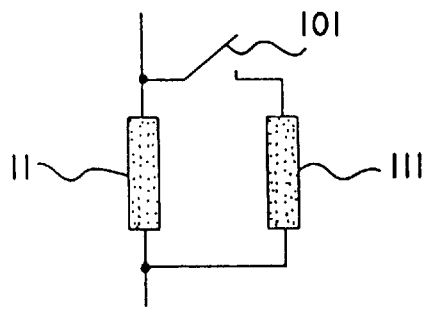
Figure 5D:
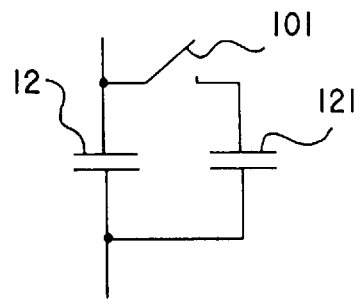

FIGS. 4a–4c show pointer diagrams of such variables as they are detected by the demodulator 31. Pointers A designate the amplitudes of the variables without the influence of the transponder 2, and pointers B designate the variables (modulation amplitudes) under the influence of the transponder 2. A pointer T shows the influence of the inductive coupling of the transponder 2 with its code information.

In the normal situation, the amplitude and phase of the oscillation vary from the load modulation by the transponder (FIGS. 4a and 4b). The pointer rotates by an angle φ as a result of the phase change, and varies in its amount. The difference in the amplitudes is indicated by reference symbol B'. Reference symbol B' represents a portion of the code information. In FIG. 4a, the modulation amplitude has varied positively (the amplitude has become larger), and conversely negatively in FIG. 4b (the amplitude has become lower).

Due to production tolerances of the components used in the resonant circuits or due to temperature changes, in exceptional cases it can happen that while the phase of the pointer changes, nevertheless its amplitude does not change (or hardly changes). This case is shown in FIG. 4c. The demodulator 31 therefore does not detect any change in amount, because it does not detect the phase. At its output there is then no code information, even though the functional transponder 2 is acting on the resonant circuit. In such a situation, the operating point of the resonant circuit system is at a so-called "zero point".

This kind of location of the operating point is undesired. It can be avoided, at very great effort, for instance by rejecting components having only close tolerances, and/or by making complicated provisions for temperature regulation of the entire circuit.

Conversely, according to the invention, that is accomplished by "mistuning" the resonant transmitter circuit whenever the resonant circuit has its operating point at a zero point.

Consequently, the operating point is moved out of the zero point.

The resonant transmitter circuit can be mistuned by changing its resonant frequency $f_R$ or by changing its exciter frequency $f_E$. In other words, the exciter frequency $f_E$ and the resonant frequency $f_R$ vary relative to one another in response to external influence.

Only the variables of the components, such as the inductances of the coils 11 or 21 and the capacitances of the capacitors 12 or 22 of both the transmitter 1 and the transponder 2 contribute to the resonant frequency $f_R$. Since the components of the transponder 2 are permanently cast in the key ignition key, it is simpler to vary only the variables of the transmitter coil 11 and the transmitter capacitor 12.

FIGS. 5a–5d show some possibilities for varying the inductance or capacitance of the resonant transmitter circuit. To that end, series resistors or parallel resistors (supplementary coil 111) and series capacitors or parallel capacitors (supplementary capacitor 121) are added to or taken away from the resistors (transmitter coil 11) and capacitors (transmitter capacitor 12) that are present in the resonant circuit of a stationary antenna. Through the use of this change in the inductance or capacitance, the resonant frequency $f_R$ of the resonant circuit changes, and thus the operating point also changes, since the distinction or difference between the exciter frequency $f_E$ and resonant frequency $f_R$ has changed.

Standard diodes or transistors can be used as switch elements 101. For instance, if after no more than three attempts the evaluation unit decides that an evaluatable code signal is not present, or in other words the operating point is in a zero point region, then the serial/parallel resistors or serial/parallel capacitors are added or taken away under the control of the evaluation unit 3.

In FIG. 6, a tolerance range diagram is shown, from which the location of the operating point and the location of zero point regions 52 can be seen. The operating point of the resonant circuit system is defined by the system parameters of frequency, amplitude and phase. The operating point as a function of the change in the standardized resonant frequency of the transmitter $\Delta f_{RS}/f_{RS}$ (on the X axis), and the variation in the standardized resonant frequency of the transponder $\Delta f_{RT}/f_{RT}$ (on the Y axis) are plotted.

Since the frequency is dependent on the values of the components, the operating point at certain values of the components and at a certain temperature is at some arbitrary predetermined point of the X-Y plane of FIG. 6.

The location of the operating point is limited by the power limit 51, since if the operating point were outside that limit 51 too little energy would reach the transponder 2 and thus an overly low modulation amplitude would reach the demodulator 31, meaning that no demodulation would be possible.

If the temperature or the values of the components vary because of component tolerances, then the operating point shifts within the X-Y plane. When an anti-theft system according to the invention is constructed, the values are calculated in such a way that at a certain temperature, the operating point will be reliably located either in a normal signal location 53 or an inverted signal location 54. In the dimensioning of the resonant circuit, it is always attempted to have the operating point located as close as possible to the middle, or in other words far away from the zero point regions 52.

In this kind of command location, the code information of the transponder 2 can be reliably extracted from the oscillation, since the demodulator 31 receives a sufficiently large amplitude, regardless of its sign. In the normal signal location 53, the normal code information, as output by the transponder 2, is detected. In the inverted signal location, the inverted code information is detected, which differs from the normal code information only in its sign. It therefore does not matter whether the demodulator 31 detects the normal code information or only the inverted code information.

It can be learned from the code information whether the user was authorized to gain access to the vehicle or to start the vehicle.

Due to production-dictated component tolerances or due to the influence of temperature, the operating point can undesirably shift enough that it is located in a zero point region 52. In that region, the code information is not detected, since the amount of the amplitude has not changed or has changed too little. The operating point must therefore be varied in such a way that it returns to a reliable location (the normal location 53 or the inverted signal location 54).

This is accomplished by varying the difference between the resonant frequency $f_R$ and exciter frequency $f_E$. In other words, the resonant circuit is mistuned if the operating point is initially in a zero point.

In FIG. 6, the location of the operating point is shown as a function of changes in the frequency $\Delta f_{RS}$ of the resonant transmitter circuit and of changes in the frequency $\Delta f_{RT}$ of the resonant transponder circuit. Changes in the frequency can pertain to both the resonant frequency $f_R$ and the exciter frequency $f_E$.

Reference symbol $P_i$ (i=0 to 5) designates respective operating points. For the sake of a better explanation it is assumed that the operating point $P_0$ or $P_3$ is initially at a zero point within the zero point region 52 (although this is intended to be the exception in the anti-theft system), because of the influence of temperature or component tolerances. The width of the zero point region 52 depends on the quality or sensitivity of the demodulator 31. The lower the amplitudes it can still evaluate, the narrower the zero point region 52.

Changes in the difference between the resonant frequency $f_R$ of the transmitter 1 and the exciter frequency $f_E$ have an effect only in the X direction, and conversely changes in the difference between the resonant frequency $f_R$ of the transponder 2 and the exciter frequency $f_E$ have an effect only in the Y direction. In other words, if only the resonant frequency $f_R$ of the resonant transmitter circuit (a change in the values of the components of the transmitter 1) changes, then the operating point moves solely in the horizontal direction, that is from the operating point $P_0$ either toward $P_1$ or toward $P_2$ (represented by the arrows in FIG. 6), depending on the magnitude of the change in the capacitance and the inductance in the resonant circuit.

The size of the serial/parallel resistor or the serial/parallel capacitor that is added or taken away must be determined to be large enough to ensure that the operating point $P_0$ will move reliably from the zero point region into a normal or inverted signal position.

Instead of a change in resonant frequency, a change in exciter frequency can also occur. A change in the exciter frequency $f_E$ affects both the transponder 2 and the transmitter 1, because both resonant frequencies vary relative to the exciter frequency $f_E$. An exciter frequency change $\Delta f_E$ therefore causes a change in the operating point $P_3$ parallel to the 45° axis in the tolerance range diagram. This is because an exciter frequency change causes the resonant circuit, especially the resonant circuit of the transmitter and receiver, to oscillate at a frequency that differs from the resonant frequency $f_R$. The operating point therefore moves from operating point $P_3$ toward $P_4$ or $P_5$ (represented by arrows). The shortest possible paths are taken in departing from the zero point regions.

The exciter frequency $f_E$ can be changed in the most varied ways. One way is for the oscillator frequency $f_O$, which is also provided for clocking the control unit 33, to be varied in analog fashion. This causes the exciter frequency $f_E$ to shift. However, a digital frequency divider 41 may also be connected between the oscillator 4 and the resonant circuit. The frequency divider 41 can be varied in digital increments, or in other words the exciter frequency $f_E$ can be varied far enough to ensure that the operating point is reliably at a normal or inverted signal location.

Another possibility is to provide a separate oscillator 42, which excites only the resonant circuit but does not clock the evaluation unit 3. A VCO frequency oscillator (voltage-controlled oscillator) can be used as the oscillator. In that case, the oscillator 4 will be used only to clock the evaluation unit 3 but not to excite the resonant circuit.

Upon each frequency change, the resonant circuit is mistuned in such a way that the operating point reliably moves from a zero point region into a signal location in which the code information is reliably detected.

The resonance curve in FIG. 3 illustrates the energy balance of the resonant circuit. The maximum energy is transmitted at the resonant frequency $f_R$. At this frequency, the exciter intensity I is at its maximum. In constructing the anti-theft system, the attempt is always made to locate the operating point as closely as possible at the maximum, that is for the exciter frequency $f_E$ to approach the resonant frequency $f_R$, and thus to make the area between the zero point regions 52 as large as possible. However, tolerances or temperature factors can cause a difference between the two frequencies $f_E$ and $f_R$ to arise, so that the transmitted energy is at somewhat lower values, and the operating point shifts toward the zero point regions 52.

If the exciter frequency $f_E$ or the resonant frequency $f_R$ is varied, then the operating point moves away from the original operating point $P_0$ either toward $P_1$ or toward $P_2$ (represented by arrows), depending on the frequency change.

In the invention the attempt is made initially to have the operating point at the maximum possible energy production. If this operating point is nevertheless located at a zero point, then the resonant circuit must be mistuned. The operating point can therefore move away from maximum energy. In the invention, lower energy transmission is therefore accepted as a compromise, and the operating point is always located as far away as possible from the zero point regions.

Figure 7:
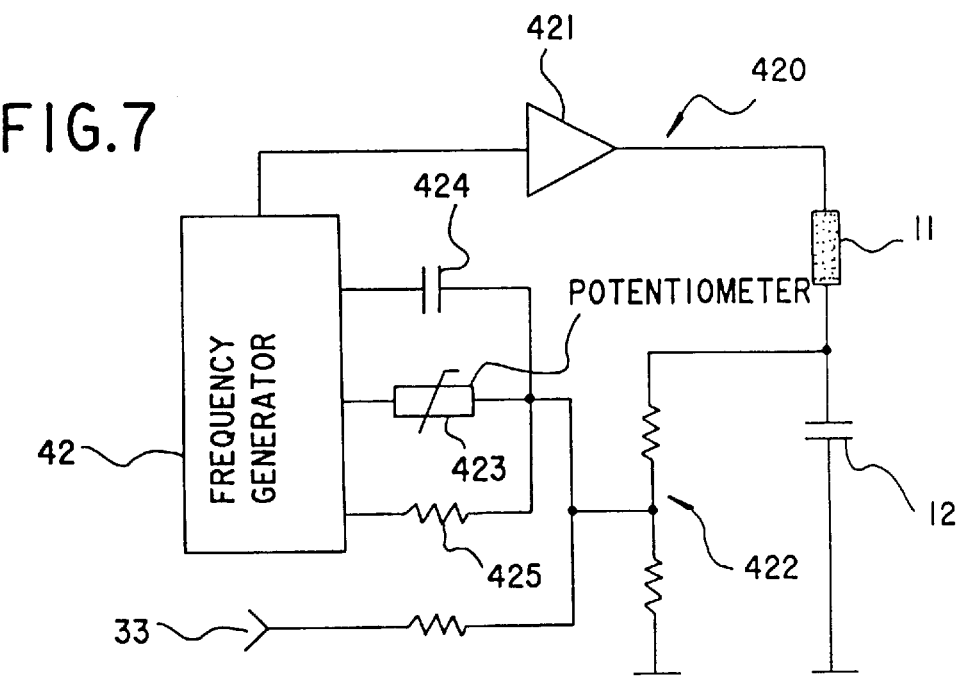
FIG. 7 is a schematic and block diagram of a regulating circuit for optimizing transmitting power.

Through the use of an additional control circuit, the operating point is placed at maximum possible power. One such control circuit 420 is shown in FIG. 7. The controlled frequency generator 42 has an end stage 421 which excites the transmitter coil 11 and the transmitter capacitor 12 and thus compels an oscillation. The oscillation is fed back to the frequency generator 42 between the capacitor 12 and the coil 11 through a resistance divider 422 and a potentiometer 423. The power can thus be optimized.

If the initially set operating point is located in a zero point, then the frequency of the generator 42 and thus the exciter frequency $f_E$ must be varied. As soon as a zero point is detected, then through the control unit 33 a signal is supplied to the frequency generator 42 to offset the frequency (to vary the frequency by a certain frequency). It is understood that the operating point associated with maximum output is then moved away from. However, since the assumption was maximum power, it cannot happen that the power limit 51 is exceeded, which conversely might be the case in an extreme situation in which, because of component tolerances and the influence of temperature, the operating point is initially not at the maximum point of the resonance curve and a frequency change moves away from this operating point along the resonance curve.

A change in the exciter frequency $f_E$ takes place only within a certain tolerance width. As soon as a zero point is detected, the exciter frequency $f_E$ is varied by a certain amount. If the operating point is still at a zero point, then the frequency is changed once again. Change is carried out only within the maximum tolerance width (maximum frequency difference from the initially set frequency), which is defined in such a way that the operating point in any case is shifted into a reliable signal location. However, the change in frequency must not go so far that the power limit 51 is exceeded.

As soon as the ignition key is inserted into the ignition lock, the supply of energy to the oscillator 4, 42 and the evaluation unit 3 is switched on, through a non-illustrated mechanical, magnetic or electric switch. If the operating point is initially at a zero point, the resonant circuit is mistuned, but only within a certain period of time after the energy supply is turned on. After that, the procedure is discontinued, and the vehicle cannot be started or the door locks remain locked, so that access to the motor vehicle is not possible. Consequently access or starting of the engine is impossible even with a mechanical key.

The resonant circuit may, as dictated by its components, have a resonant frequency $f_R$ of 125 kHz, for example. The evaluation unit is clocked at an oscillator frequency $f_O$ of approximately 4 MHz. In order to use the oscillator to excite the resonant circuit as well, a 1/32 frequency divider 41 is inserted between the oscillator 4 and the resonant circuit. The exciter frequency $f_E$ is thus approximately 125 kHz.

The exciter frequency $f_E$ can be varied and the resonant circuit thus mistuned by varying the oscillator frequency $f_O$ by a predetermined amount. In the oscillator 4, a so-called ceramic resonator can be used, because that is simpler to vary in its frequency than a quartz oscillator.

Instead of using the variable oscillator frequency $f_O$, the resonant circuit can also be mistuned with the aid of a digital frequency divider which, with a divider that is adjustable from 31.5 to 32.5, for instance, divides the oscillator frequency $f_O$ and thus varies the exciter frequency $f_E$. The divider 41 is first set to the value 32. If a zero point is ascertained, then the resonant circuit is mistuned and the divider is varied in such a way that the exciter frequency $f_E$ differs by approximately 3% from the former frequency. If the operating point is still within the zero point region, then the divider ratio is changed once again. However, these changes are limited by the power limit.

If the oscillator frequency can be used directly for exciting the resonant circuit, then the frequency divider 41 is not needed (represented by dashed lines in FIG. 2).

However, an external, analog-variable oscillator 42 with an oscillator frequency $f_O$ of approximately 125 kHz can also be used. Then the exciter frequency $f_E$ is equal to the oscillator frequency $f_O$ and is approximately equal to the resonant frequency $f_R$. The resonant circuit is then mistuned by varying the oscillator frequency $f_O$. In that case, an independent oscillator 4, which otherwise has no influence on the resonant circuit, is used for the evaluation unit.

The control unit 33 can be constructed as a microprocessor or as a functionally equivalent circuit configuration. The function of the comparator 32 can therefore also be performed by the microprocessor in the control unit 33. The command code information is stored in a non-illustrated memory (ROM, EEPROM) of the evaluation unit 3.

We claim:

1. An anti-theft system for a motor vehicle, comprising:
   a portable transponder carrying an item of code information;
   a stationary antenna having a resonant circuit with components and a resonant frequency being determined by said components;
   an oscillator oscillating at an oscillator frequency and having an output variable being used as an exciter variable with an exciter frequency for compelling an oscillation of said resonant circuit, the oscillation being amplitude-modulated as a function of the code information of said transponder;
   an evaluation unit receiving the oscillation of said resonant circuit, said evaluation unit detecting the modulated oscillation and demodulating the code information out of the oscillation;
   a comparator comparing the code information with command code information and supplying an enable signal if a match occurs; and
   a security unit receiving the enable signal;
   the exciter frequency or the resonant frequency of said resonant circuit being varied if initially no code information is recognized by said evaluation unit.

2. The anti-theft system according to claim 1, wherein said resonant circuit has a transmitter coil and a capacitor connected in series or in parallel with said transmitter coil, for determining the resonant frequency.

3. The anti-theft system according to claim 2, including at least one series or parallel resistor, the resonant frequency of said resonant circuit being varied by adding or removing said at least one series or parallel resistor to or from said transmitter coil.

4. The anti-theft system according to claim 2, including a second capacitor, the resonant frequency of said resonant circuit being varied by adding or removing said second capacitor to or from said capacitor.

5. The anti-theft system according to claim 2, including a receiver coil through which said transponder is inductively coupled with said transmitter coil.

6. The anti-theft system according to claim 5, wherein the oscillation of said resonant circuit is load-modulated as a function of the code information as a consequence of the inductive coupling.

7. The anti-theft system according to claim 5, wherein said security unit is a door lock.

8. The anti-theft system according to claim 5, wherein said security unit is a driveaway interlock.

9. The anti-theft system according to claim 1, wherein the exciter frequency is varied by varying the oscillator frequency.

10. The anti-theft system according to claim 9, including an adjustable frequency divider disposed between said oscillator and said resonant circuit for varying the exciter frequency.

11. The anti-theft system according to claim 9, wherein the exciter frequency is varied only within a predetermined tolerance width.

12. The anti-theft system according to claim 1, including an ignition key on which said transponder is disposed, said ignition key turning on a supply of energy for said oscillator and said evaluation unit.

13. The anti-theft system according to claim 12, wherein the exciter frequency or the resonant frequency is varied only within a predetermined period of time after the energy supply is turned on.

* * * * *